United States Patent
Pignataro et al.

(10) Patent No.: US 12,323,331 B2
(45) Date of Patent: Jun. 3, 2025

(54) SUSTAINABLE NETWORK-WIDE OPTIMIZATION SERVICE

(71) Applicant: Cisco Technology, Inc., San Jose, CA (US)

(72) Inventors: Carlos Pignataro, Cary, NC (US); Pascal Thubert, Roquefort les Pins (FR); Eric A. Voit, Bethesda, MD (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/462,209

(22) Filed: Sep. 6, 2023

(65) Prior Publication Data
US 2025/0080464 A1    Mar. 6, 2025

(51) Int. Cl.
*H04L 47/127* (2022.01)
*H04L 47/2425* (2022.01)

(52) U.S. Cl.
CPC ........ *H04L 47/127* (2013.01); *H04L 47/2425* (2013.01)

(58) Field of Classification Search
CPC .......................... H04L 47/127; H04L 47/2425
(Continued)

(56) References Cited

U.S. PATENT DOCUMENTS 10,581,736 B1 *  3/2020  Choudhury ......... H04L 43/0876
11,323,358 B1    5/2022  Kadu
(Continued)

FOREIGN PATENT DOCUMENTS

| CN | 106031102 B | 11/2019 |
|---|---|---|
| EP | 2577919 B1 | 5/2018 |
| GB | 2539993 A | 1/2017 |

OTHER PUBLICATIONS

Katta, N., et al. "Clove: Congestion -Aware Load Balancing at the Virtual Edge," In Proceedings of CoNEXT '17: The 13th International Conference on emerging Networking Experiments and Technologies, Incheon, Republic of Korea, Dec. 12-15, 2017.
(Continued)

*Primary Examiner* — Karen C Tang
(74) *Attorney, Agent, or Firm* — Rutan & Tucker, LLP; Ravi Mohan

(57) ABSTRACT

Described herein are devices, systems, methods, and processes for optimizing network traffic distribution across multiple paths in a manner that is energy-efficient and environmental sustainability-aware. This may be achieved by leveraging time-series analytics and capacity planning based on seasonalities. Data associated with the Layer 3 topology of the network can be collected. Bandwidth can be pre-reserved on an energy-aware traffic engineering tunnel. The time-series data can be used to build a capacity plan based on the seasonalities. Nodes may be clustered based on usage patterns and network utilization seasonality. The data can be used to make decisions about when and where to combine or shut down paths for energy efficiency, while maintaining optimal network performance. A hysteresis mechanism may be incorporated to avoid oscillation when changing active links. Power savings can be achieved by fully turning off or depowering certain network components when they are not needed.

20 Claims, 8 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 12,034,593 | B1* | 7/2024 | Schrimpsher | H04L 45/566 |
| 2015/0074283 | A1* | 3/2015 | Karthikeyan | H04L 45/50 |
| | | | | 709/227 |
| 2015/0222557 | A1 | 8/2015 | Bhattacharya | |
| 2015/0333992 | A1* | 11/2015 | Vasseur | H04L 12/4633 |
| | | | | 370/252 |
| 2015/0334030 | A1* | 11/2015 | Vasseur | H04L 47/115 |
| | | | | 370/252 |
| 2016/0182305 | A1* | 6/2016 | Martin | H04L 43/065 |
| | | | | 370/254 |
| 2016/0249223 | A1* | 8/2016 | Egner | H04W 40/12 |
| 2017/0207996 | A1* | 7/2017 | Lui | H04L 43/0829 |
| 2018/0063261 | A1* | 3/2018 | Moghe | G07C 5/008 |
| 2018/0198716 | A1* | 7/2018 | Karthikeyan | H04L 47/805 |
| 2019/0372857 | A1* | 12/2019 | Gandhi | H04L 41/0896 |
| 2020/0252300 | A1* | 8/2020 | Levy-Abegnoli | |
| | | | | H04L 41/0895 |
| 2021/0385155 | A1 | 12/2021 | Suryanarayana et al. | |
| 2022/0272029 | A1* | 8/2022 | Vasseur | H04L 45/24 |
| 2023/0145097 | A1* | 5/2023 | Kiran | H04L 47/2483 |
| | | | | 370/235 |

OTHER PUBLICATIONS

Clemm A., et al., "Challenges and Opportunities in Management for Green Networking", draft-irtf-nmrg-green-ps-00, Network Working Group, Internet-Draft, Jul. 5, 2023, pp. 1-27, XP015160503, Retrieved from https://tools.ietf.org/html/draft-irtf-nmrg-green-ps-00 on Jul. 5, 2023, The Whole Document.
International Search Report and Written Opinion for International Application No. PCT/US2024/045638, mailed Dec. 12, 2024, 17 Pages.

* cited by examiner

SUSTAINABLE NETWORK-WIDE OPTIMIZATION SERVICE

The present disclosure relates to network traffic management. More particularly, the present disclosure relates to optimizing network traffic distribution across multiple paths in an energy-efficient and sustainability-aware manner.

BACKGROUND

In the realm of network management, internet protocol (IP) packets entering a router may have multiple alternative paths to traverse within an operational domain. The packets can be distributed across paths of equal cost or near equal cost. The existence of these multiple paths is important as they cater to the needs of redundancy and load balancing traffic across all available capacity.

However, with the growing emphasis on energy efficiency, the Internet, and networking in general are evolving towards a model where links are selectively depowered. IN other words, just those links needed to serve the expected traffic will draw power and forward packets. This evolution presents several challenges. One of these challenges is how to prevent forwarding traffic down paths where further along that path, routers are dropping packets. This scenario is possible if many physical paths within the infrastructure are being cycled on/off or going into sleep mode to minimize total energy expenditure.

Current solutions, such as equal cost multi-path (ECMP) or unequal cost multi-path (UCMP), are routing strategies where packets towards a single destination IP address are load-balanced over multiple best paths with equal or unequal metrics. However, these strategies do not take into account energy efficiency or sustainability. Therefore, there is a need for network-wide optimization protocols that are energy or sustainability aware.

SUMMARY OF THE DISCLOSURE

Systems and methods for optimizing network traffic distribution across multiple paths in an energy-efficient and sustainability-aware manner in accordance with embodiments of the disclosure are described herein. In some embodiments, a network node, includes a processor, at least one network interface controller configured to provide access to a network, and a memory communicatively coupled to the processor, wherein the memory includes a sustainability logic. The logic is configured to predict a traffic volume for at least a portion of the network, identify a topology of the portion of the network, the portion of the network including a plurality of links and a plurality of nodes, identify a capacity of each of at least some of the plurality of links and each of at least some of the plurality of nodes, determine one or more links to reserve in the plurality of links based on the predicted traffic volume and the identified capacity, wherein an overall capacity of the one or more links is sufficient to serve the predicted traffic volume, and an attempt to reduce a number of links in the one or more links is made in determining the one or more links to reserve, and reserve the determined one or more links.

In some embodiments, the portion of the network corresponds to an interior gateway protocol (IGP) domain.

In some embodiments, the traffic volume is predicted based on time-series data associated with bandwidth utilization over time in at least the portion of the network.

In some embodiments, the predicted traffic volume is reevaluated for one or more further time durations based on an identified present traffic volume associated with at least the portion of the network.

In some embodiments, the sustainability logic is further configured to depower one or more non-reserved links in the plurality of links.

In some embodiments, the sustainability logic is further configured to identify an energy cost associated with each of the at least some of the plurality of links and each of the at least some of the plurality of nodes, wherein the one or more links to reserve are determined based further on the identified energy cost, and an attempt to reduce a total energy cost associated with the one or more links is made in determining the one or more links to reserve.

In some embodiments, the energy cost is associated with at least a respective power efficiency metric or an energy source type.

In some embodiments, an attempt to minimize a number of changes in one or more link reservation states with respect to a set of previously reserved links is made in determining the one or more links to reserve.

In some embodiments, the overall capacity of the one or more links being sufficient to serve the predicted traffic volume corresponds to a service level agreement (SLA) being met.

In some embodiments, the one or more links to reserve are determined based further on clustering one or more nodes in the plurality of nodes, and the one or more nodes are clustered based on one or more network usage patterns or a network utilization seasonality.

In some embodiments, the one or more nodes are clustered based on a machine learning process.

In some embodiments, the sustainability logic is further configured to redetermine the one or more links to reserve in response to a changed relationship between the predicted traffic volume and the overall capacity of the reserved one or more links.

In some embodiments, the redetermining is subject to hysteresis.

In some embodiments, the sustainability logic is associated with one or more triggers.

In some embodiments, the one or more triggers include at least one of a policy, an application activity, or a power load.

In some embodiments, the portion of the network includes at least one of an equal cost multi-path (ECMP) system, an unequal cost multi-path (UCMP) system, or a tunneling system.

In some embodiments, the sustainability logic is further configured to enable all of the plurality of links regardless of the reservation in response to an actual traffic volume for the portion of the network exceeding a threshold.

In some embodiments, the topology of the portion of the network includes a Layer 3 (L3) topology.

In some embodiments, a network node, includes a processor, at least one network interface controller configured to provide access to a network, and a memory communicatively coupled to the processor, wherein the memory includes a sustainability logic. The logic is configured to predict a traffic volume for at least a portion of the network, identify a topology of the portion of the network, the portion of the network including a plurality of links and a plurality of nodes, identify a capacity of each of at least some of the plurality of links and each of at least some of the plurality of nodes, identify an energy cost associated with each of the at least some of the plurality of links and each of the at least some of the plurality of nodes, determine one or more links to reserve in the plurality of links based on the predicted traffic volume, the identified capacity, and the identified energy cost, wherein an overall capacity of the one or more links is sufficient to serve the predicted traffic volume, and an attempt to reduce a number of links in the one or more links and to reduce a total energy cost associated with the one or more links is made in determining the one or more links to reserve, and reserve the determined one or more links.

In some embodiments, a method for managing sustainability in a network, includes predicting a traffic volume for at least a portion of the network, identifying a topology of the portion of the network, the portion of the network including a plurality of links and a plurality of nodes, identifying a capacity of each of at least some of the plurality of links and each of at least some of the plurality of nodes, determining one or more links to reserve in the plurality of links based on the predicted traffic volume and the identified capacity, wherein an overall capacity of the one or more links is sufficient to serve the predicted traffic volume, and an attempt to reduce a number of links in the one or more links is made in determining the one or more links to reserve, and reserving the determined one or more links.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
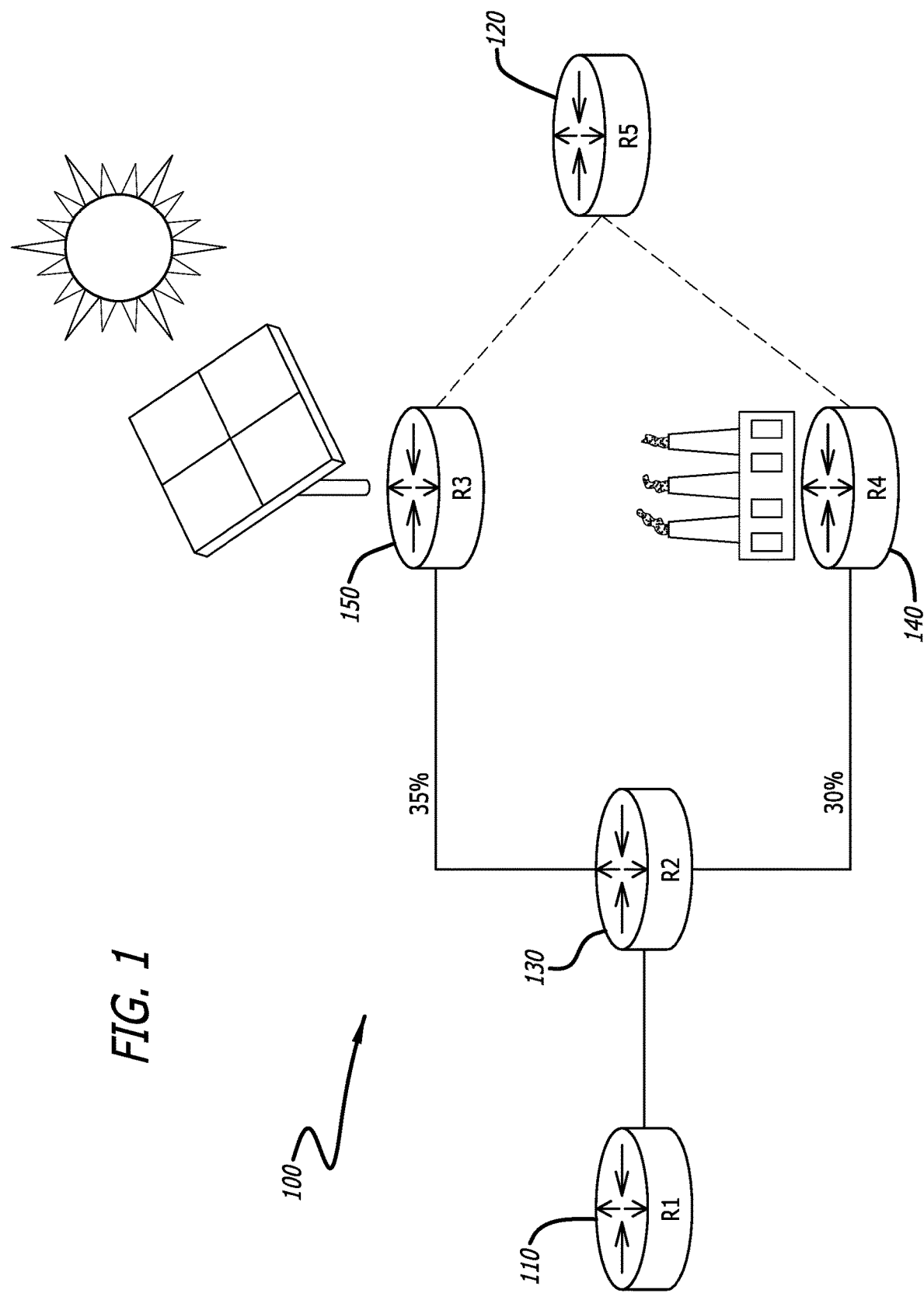
FIG. 1 is a schematic diagram of a network with network devices powered by various power source types in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that optimize network traffic distribution across multiple paths in a manner that is energy-efficient and sustainability-aware. As those skilled in the art will recognize, sustainability in the context used herein is referencing environmental sustainability, and not the ability to keep one or more processes going. This environmental sustainability may be achieved by leveraging time-series analytics and capacity planning based on seasonalities. In many embodiments, bandwidth can be pre-reserved on an energy-aware traffic engineering (TE) tunnel, creating a meta-reservation.

In existing networks, a network device, such as a router, chooses the best route to take based on reachability information. The information includes prefix length, where the longest prefix match is preferred. By way of a non-limiting example, a /24 route is chosen over a /16 route. If the routes have the same prefix lengths and are using different routing protocols, then the route with the lowest administrative distance (AD) wins. By way of a non-limiting example, open shortest path first (OSPF) routes are chosen over routing information protocol (RIP) routes by default. If the routes have the same prefix length and administrative distance, then the choice will come down to the metrics: The path with lower metric is chosen. When a routing table has multiple paths with identical metrics (equal cost) to the exact destination network, equal cost multi-path (ECMP) or load balancing occurs. Unequal cost multi-path (UCMP) is similar to ECMP, but UCMP load-balances based on unequal metrics (e.g., 2 parallel paths, one of which is used twice as much as the other).

In a number of embodiments, bandwidth utilization over time for each node or link in the layer 3 (L3) (i.e., the network layer) topology may be captured. The bandwidth utilization over time may exhibit seasonalities (e.g., daily, monthly, and/or annual seasonalities). Hereinafter seasonality may refer to predictable patterns or trends in data that recur or fluctuate over specific time periods, such as, but not limited to, hours of the day, days of the week, or months of the year. Further, network characteristics over time (e.g., central processing unit (CPU) usage and/or power consumption at L3 nodes) can also be captured. The time-series data (which can extend beyond the immediate reservation interval) can be used to build a capacity plan based on the seasonalities. In a variety of embodiments, the time-series analysis can be done in real time based on examining the reservation system (i.e., not necessarily the traffic itself). In further additional embodiments, the predicted traffic can be (continuously) reevaluated for a series of upcoming time durations/intervals based on the current traffic volume on and/or beyond the portion of the network. In some embodiments, various triggers, such as, but not limited to, policy (static or dynamic), application activity (chattiness), or power load, can be used to make relevant energy-efficient decisions.

In more embodiments, nodes may be clustered based on usage patterns and network utilization seasonality. The clustering can allow for efficient shutting down and bypassing of some of the nodes and links at certain time or location. In additional embodiments, interior gateway protocol (IGP) domain messages can provide data about network traffic, link status, and node capacity. The data can be used to make decisions about when and where to combine or shut down paths for energy efficiency, while maintaining optimal network performance. By way of a non-limiting example, if two ECMPs can be combined into one path, and the other path can be shut down (depowered), environmental sustainability would be improved without sacrificing resiliency.

In further embodiments, links may be depowered when the depowering will not lead to congestion and traffic loss beyond acceptable limits. Traffic can be routed in a way that avoids hardware that is likely to drop packets. While combining or shutting down paths can optimize energy usage, it may also lead to network congestion. Therefore, in still more embodiments, a threshold trigger that prioritizes network performance can be implemented. If congestion reaches a certain level (e.g., if the actual traffic volume exceeds a threshold), the trigger may temporarily halt energy-saving measures (e.g., all the links can be enabled regardless of the reserved/non-reserved states of the links), focusing the network instead on alleviating congestion to ensure smooth network operations.

In still further embodiments, a hysteresis mechanism may be incorporated to avoid oscillation when changing active (reserved) links. This means that a link may not be immediately depowered or powered up in response to minor fluctuations in network traffic. Instead, a certain threshold needs be crossed by the fluctuations before the powering up and/or depowering take place. In still additional embodiments, the threshold can be higher for depowering a link than for powering it up. Accordingly, an affinity for existing topologies may be maintained, and incremental adjustments can be made to optimize energy efficiency, rather than making drastic changes.

In some more embodiments, power savings can be achieved by fully turning off or depowering certain network components, such as, but not limited to, optics, ports, line-cards, and full nodes, when they are not needed (e.g., when they are not reserved). In certain embodiments, the drawbacks of local decision-making or optimization may be overcome. Local decision-making can refer to the practice of making routing decisions based on data available at a single node or a small subset of nodes. In contrast, in yet more embodiments, decisions may be made based on a comprehensive view of the network, taking into account data from all nodes and links.

In still yet more embodiments, a closed loop cycle may be utilized to optimize network traffic distribution and energy efficiency. The cycle can begin with the collection of metrics, which may involve gathering data on bandwidth utilization and various network characteristics such as, but not limited to, CPU usage and power consumption. The data may then be used to identify patterns or establish a baseline, providing a comprehensive understanding of the network's typical behavior and performance. The next step can involve applying analytics in real time to the collected data. Based on these analytics, the traffic may then be steered or routed in an energy efficient manner. This can involve combining or shutting down paths, or adjusting the distribution of traffic across different paths. The cycle may be continuous, with ongoing metric collection and analysis, ensuring that the network adapts to changing conditions and maintains optimal performance and energy efficiency.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more environmentally sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal environmentally sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements (SLAs), etc. that can alter sustainability-optimization. The elements depicted in FIG. 1 may also be interchangeable with other elements of FIGS. 2-7 as required to realize a particularly desired embodiment. Augmented protocols to carry out these described processes are described below.

Figure 2:
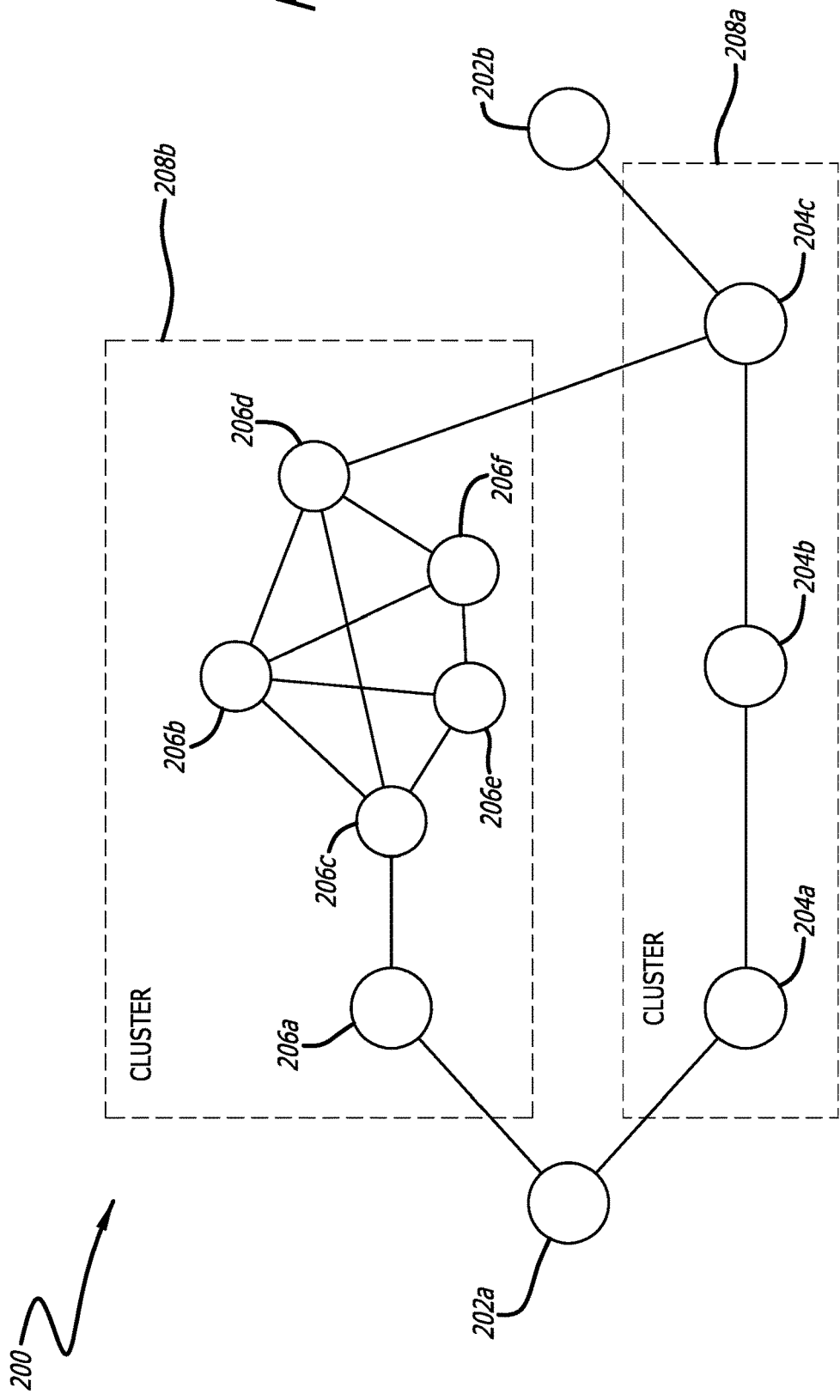
FIG. 2 is a diagram illustrating a network with multiple paths and nodes, and sustainability management in accordance with various embodiments of the disclosure.

Referring to FIG. 2, a diagram illustrating a network 200 with multiple paths and nodes, and sustainability management in accordance with various embodiments of the disclosure is shown. As shown in the embodiment depicted in FIG. 2, the network may include a first node 202a and a second node 202b, with multiple paths connecting them. In many embodiments, one non-limiting example of a path is from node 202a to node 202b via nodes 204a, 204b, and 204c. Another non-limiting example is from node 202a to node 202b via nodes 206a, 206c, and 206d, with one or more of nodes 206b, 206e, and 206f in between nodes 206c and 206d, and finally through node 204c. In a number of embodiments, either of the two paths may have sufficient capacity to serve the predicted traffic volume.

In a variety of embodiments, nodes 204a, 204b, and 204c form a cluster 208a, while nodes 206a, 206b, 206c, 206d, 206e, and 206f form another cluster 208b. The formation of the clusters can be based on various factors. In some embodiments, the clustering may be based at least in part on usage patterns and/or network utilization seasonality. In more embodiments, the clustering may be based at least in part on the types of energy sources. By way of a non-limiting example, nodes 204a, 204b, and 204c may be clustered together based on these nodes being powered by green or renewable energy, while nodes 206a, 206b, 206c, 206d, 206e, and 206f may be clustered together based on these nodes being powered by conventional (fossil fuel) energy.

In additional embodiments, the path from node 202a to node 202b via nodes 204a, 204b, and 204c may be favored due to its association with the clean energy cluster 208a. Accordingly, this path may be reserved, allowing the nodes and links on this path to remain powered. In further embodiments, non-reserved nodes and links (e.g., nodes and links associated with the cluster 208b) can be depowered to reduce energy consumption, especially energy consumption associated with conventional or fossil fuel energy.

Although a specific embodiment for a network with multiple paths and nodes suitable for carrying out the various steps, processes, methods, and operations described herein is discussed with respect to FIG. 2, any of a variety of systems and/or processes may be utilized in accordance with embodiments of the disclosure. For example, the energy source of the nodes can be a mix of renewable and conventional energy, and the clustering can be based on other factors such as network traffic, node capacity, or geographical location. The elements depicted in FIG. 2 may also be interchangeable with other elements of FIGS. 1 and 3-8 as required to realize a particularly desired embodiment.

Figure 3:
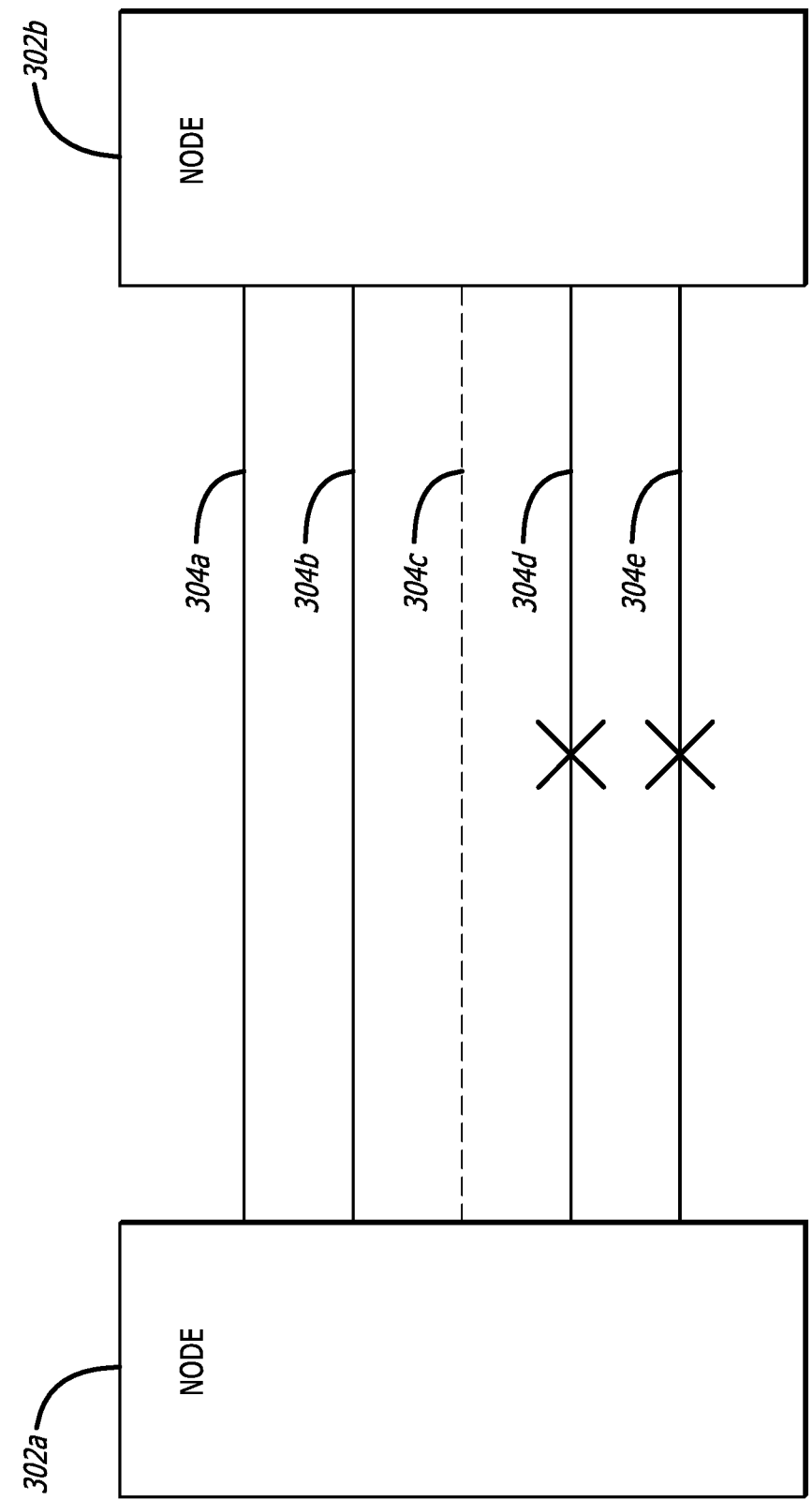
FIG. 3 is a diagram illustrating a simplified network with two nodes and multiple links between them, and sustainability management in accordance with various embodiments of the disclosure.

Referring to FIG. 3, a diagram illustrating a simplified network 300 with two nodes and multiple links between them, and sustainability management in accordance with various embodiments of the disclosure is shown. The network may include two nodes 302a and 302b with five links between them: links 304a, 304b, 304c, 304d, and 304e. Each link may be associated with a respective interface at each of the two nodes. In many embodiments, the network traffic between nodes 302a and 302b may be worth two links, but five links may be active, each carrying traffic that is equivalent to 40% of its capacity. This scenario can present an opportunity for energy-efficiency optimization. In a number of embodiments, a decision can be made to shut down (depower) two links, specifically links 304d and 304e. The decision may be based on the calculation of traffic and capacity between nodes 302a and 302b. If the capacity, which is associated with the total number of active links, is greater than the traffic volume (e.g., greater than the traffic volume by a margin that is greater than a threshold), then a rebalancing operation can be performed.

In a variety of embodiments, after turning off 304d and 304e, one link, 304c, may be left in hot standby. In other words, link 304c can remain powered but may not actively carry traffic unless needed, for example, in case of a failure of one of the active links. In some embodiments, all traffic between the nodes 302a and 302b can be moved to the remaining two links 304a and 304b (i.e., the reserved links). As a result, sustainability may be improved by reducing the number of active links and thus the energy consumption, while the same level of resiliency can be maintained, as there is still sufficient capacity to handle the traffic between nodes 302a and 302b. In more embodiments, the process can be part of a continuous cycle of monitoring, calculating, and rebalancing to ensure optimal energy efficiency and network performance. The cycle can be triggered by various factors, such as, but not limited to, changes in network traffic, node capacity, or energy availability.

Although a specific embodiment for a network with two nodes and multiple links suitable for carrying out the various steps, processes, methods, and operations described herein is discussed with respect to FIG. 3, any of a variety of systems and/or processes may be utilized in accordance with embodiments of the disclosure. For example, the network can be a wireless network where the links represent different frequency bands or channels, and the sustainability decisions can involve switching traffic to fewer bands or channels during off-peak hours to save energy. The elements depicted in FIG. 3 may also be interchangeable with other elements of FIGS. 1, 2, and 4-8 as required to realize a particularly desired embodiment.

Figure 4:
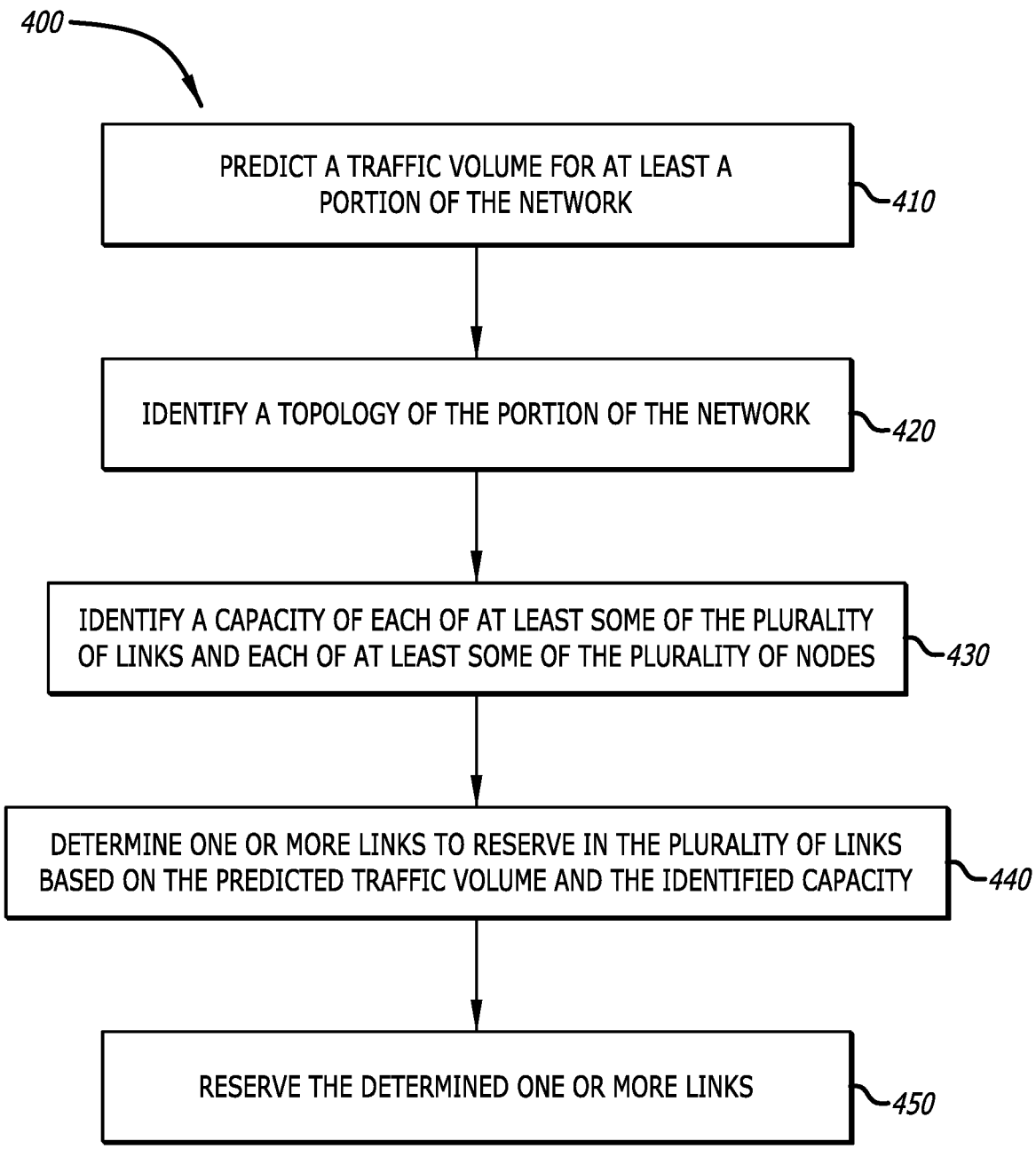
FIG. 4 is a flowchart showing a process for optimizing network traffic distribution across multiple paths in a manner that is energy-efficient and sustainability-aware in accordance with various embodiments of the disclosure.

Referring to FIG. 4, a flowchart showing a process 400 for optimizing network traffic distribution across multiple paths in a manner that is energy-efficient and sustainability-aware in accordance with various embodiments of the disclosure is shown. In many embodiments, the process 400 may predict a traffic volume for at least a portion of the network (block 410). The prediction can be based on historical data, real-time monitoring, or a combination of both. The traffic volume may be measured in various units such as, but not limited to, data rate, number of packets, or number of connections. The prediction can also take into account various factors such as, but not limited to, time of day, day of the week, month of year, or special events that could affect network traffic.

In a number of embodiments, the process 400 may identify a topology of the portion of the network (block 420). The topology can include data about the nodes and links in the network, their connections, and their capacities. The topology may be static or dynamic, and can be updated periodically or in response to changes in the network. In a variety of embodiments, the topology may be L3 topology.

In some embodiments, the process 400 may identify a capacity of each of at least some of the plurality of links and each of at least some of the plurality of nodes (block 430). The capacity can be measured in various units such as, but not limited to, data rate, number of connections, or processing power. The capacity may also take into account various factors such as, but not limited to, current load, maximum capacity, or availability of resources.

In more embodiments, the process 400 may determine one or more links to reserve in the plurality of links based on the predicted traffic volume and the identified capacity (block 440). The determination can be based on various processes or heuristics, and may aim to optimize various objectives such as, but not limited to, energy efficiency, network performance, and/or cost. The determination may also take into account various constraints such as, but not limited to, SLAs, network policies, or resource limitations. In additional embodiments, an overall capacity of the one or more links to reserve may be sufficient to serve the predicted traffic volume. In further embodiments, an attempt can be made to reduce or minimize the number of links in the one or more links. In further additional embodiments, an attempt can be made to reduce or minimize the number of links whose reservation/non-reservation states are to be changed (e.g., with respect to a set of previously/currently reserved links) in determining the one or more links to reserve. Accordingly, network changes for flows currently in transit (in flight) may be minimized. In some embodiments, an attempt to minimize a number of changes in one or more link reservation states with respect to a set of previously reserved links is made in determining the one or more links to reserve.

In still more embodiments, the process 400 may reserve the determined one or more links (block 450). The reservation can involve various actions such as, but not limited to, configuring network devices, setting up routing tables, or allocating resources. The reservation may also involve various protocols or mechanisms such as, but not limited to, reservation protocols, quality of service mechanisms, or traffic engineering techniques. The reservation can be updated periodically or in response to changes in the network. In still further embodiments, the reserved one or more links may be powered up or kept on. In still additional embodiment, the non-reserved links can be depowered.

Although a specific embodiment for optimizing network traffic distribution across multiple paths in a manner that is energy-efficient and sustainability-aware is discussed with respect to FIG. 4, any of a variety of systems and/or processes may be utilized in accordance with embodiments of the disclosure. For example, the process can be applied to a cloud-based network where the nodes represent different cloud servers, and the links represent virtual connections between them. The elements depicted in FIG. 4 may also be interchangeable with other elements of FIGS. 1-3 and 5-8 as required to realize a particularly desired embodiment.

Figure 5:
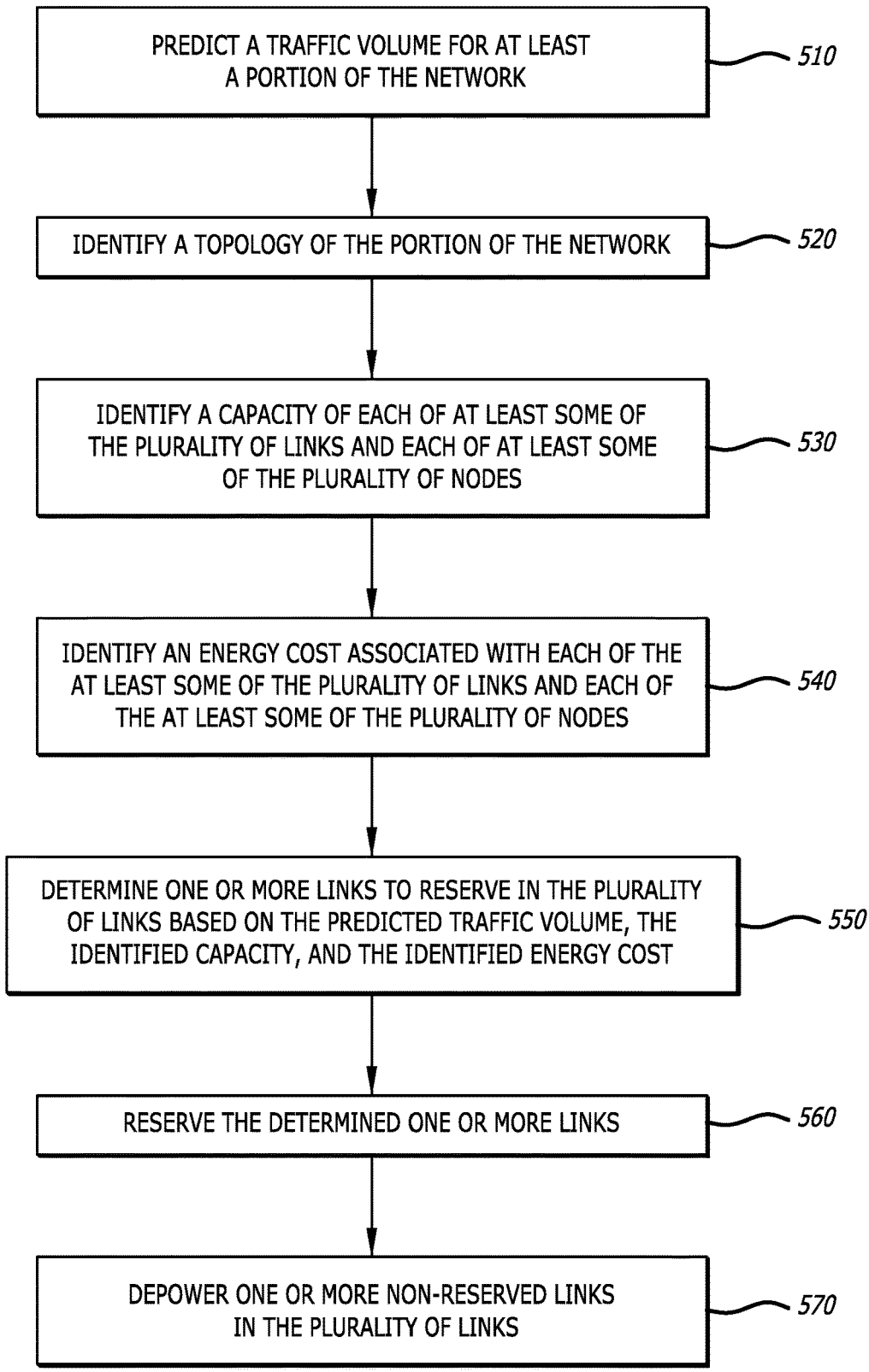
FIG. 5 is a flowchart showing a process for optimizing network traffic distribution across multiple paths in a manner that is energy-efficient and sustainability-aware in accordance with various embodiments of the disclosure.

Referring to FIG. 5, a flowchart showing a process 500 for optimizing network traffic distribution across multiple paths in a manner that is energy-efficient and sustainability-aware in accordance with various embodiments of the disclosure is shown. In many embodiments, the process 500 may predict a traffic volume for at least a portion of the network (block 510). The prediction can be based on historical data, real-time monitoring, or a combination of both. The traffic volume may be measured in various units such as, but not limited to, data rate, number of packets, or number of connections. The prediction can also take into account various factors such as, but not limited to, time of day, day of the week, month of year, or special events that could affect network traffic.

In a number of embodiments, the process 500 may identify a topology of the portion of the network (block 520). The topology can include data about the nodes and links in the network, their connections, and their capacities. The topology may be static or dynamic, and can be updated periodically or in response to changes in the network. In a variety of embodiments, the topology may be L3 topology.

In some embodiments, the process 500 may identify a capacity of each of at least some of the plurality of links and each of at least some of the plurality of nodes (block 530). The capacity can be measured in various units such as, but not limited to, data rate, number of connections, or processing power. The capacity may also take into account various factors such as, but not limited to, current load, maximum capacity, or availability of resources.

In more embodiments, the process 500 may identify an energy cost associated with each of the at least some of the plurality of links and each of the at least some of the plurality of nodes (block 540). In additional embodiments, the energy cost can be measured in various units such as, but not limited to, power consumption, carbon footprint, or cost of electricity. The energy cost may also take into account various factors such as, but not limited to, type of energy source, energy efficiency of devices, or energy prices.

In further embodiments, the process 500 may determine one or more links to reserve in the plurality of links based on the predicted traffic volume, the identified capacity, and the identified energy cost (block 550). The determination can be based on various processes or heuristics, and may aim to optimize various objectives such as, but not limited to, energy efficiency, network performance, or cost. The determination can also take into account various constraints such as, but not limited to, SLAs, network policies, or resource limitations. In still more embodiments, an overall capacity of the one or more links to reserve may be sufficient to serve the predicted traffic volume. By way of a non-limiting example, the overall capacity of the one or more links to reserve may be considered sufficient to serve the predicted traffic volume if one or more SLAs can be met. In still further embodiments, an attempt can be made to reduce or minimize the number of links in the one or more links and a total energy cost associated with the one or more links.

In still additional embodiments, the process 500 may reserve the determined one or more links (block 560). The reservation can involve various actions such as, but not limited to, configuring network devices, setting up routing tables, or allocating resources. The reservation may also involve various protocols or mechanisms such as, but not limited to, reservation protocols, quality of service mechanisms, or traffic engineering techniques. The reservation could be temporary or permanent, and could be updated periodically or in response to changes in the network. The reservation can be updated periodically or in response to changes in the network. In some more embodiments, the reserved one or more links may be powered up or kept on. In certain embodiment, the non-reserved links can be depowered.

In yet more embodiments, the process 500 may depower one or more non-reserved links in the plurality of links (block 570). The depowering can involve various actions such as, but not limited to, turning off devices or putting devices into sleep mode. The depowering may involve various protocols or mechanisms such as, but not limited to, power management protocols, energy-saving modes, or power scheduling techniques. In still yet more embodiments, The depowering can be reversed in response to changes in the network.

Although a specific embodiment for optimizing network traffic distribution across multiple paths in a manner that is energy-efficient and sustainability-aware is discussed with respect to FIG. 5, any of a variety of systems and/or processes may be utilized in accordance with embodiments of the disclosure. For example, the process can be applied to a software-defined network where the nodes represent different network functions, and the links represent virtual connections between them. The depowering may involve deallocating or reducing these resources. The elements depicted in FIG. 5 may also be interchangeable with other elements of FIGS. 1-4 and 6-8 as required to realize a particularly desired embodiment.

Figure 6:
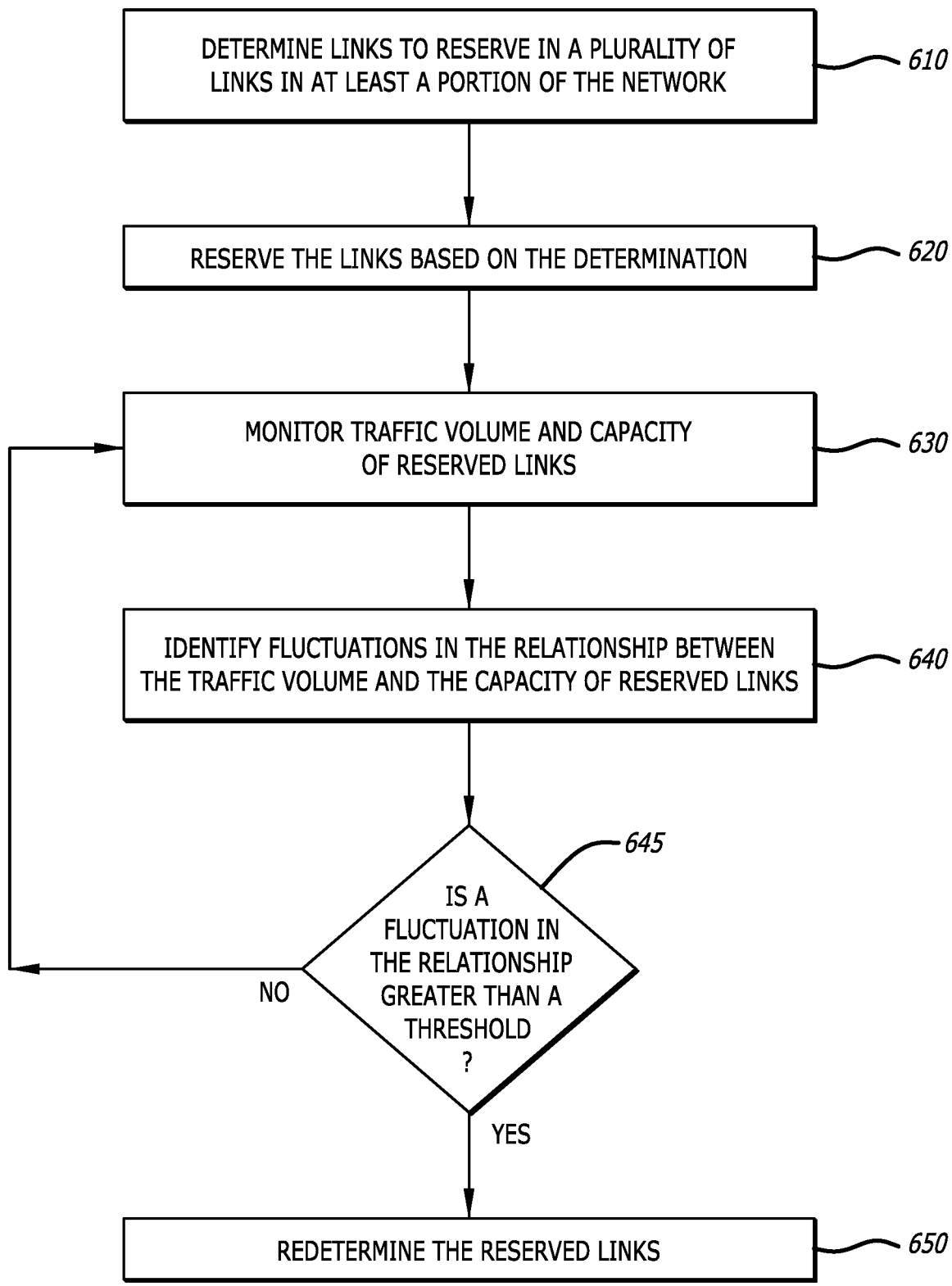
FIG. 6 is a flowchart showing a process for monitoring and adjusting reserved links in a network based on fluctuations in traffic volume and capacity in accordance with various embodiments of the disclosure.

Referring to FIG. 6, a flowchart showing a process 600 for monitoring and adjusting reserved links in a network based on fluctuations in traffic volume and capacity in accordance with various embodiments of the disclosure is shown. In many embodiments, the process 600 may determine links to reserve in a plurality of links in at least a portion of the network (block 610). The determination can be based on various factors such as, but not limited to, predicted traffic volume, capacity of the links, energy cost associated with each link, and other network parameters. The determination may also be made using various processes or heuristics that aim to optimize network performance, energy efficiency, cost, or other objectives.

In a number of embodiments, the process 600 may reserve the links based on the determination (block 620). The reservation can involve various actions such as, but not limited to, configuring network devices, setting up routing tables, or allocating resources. The reservation may also involve various protocols or mechanisms such as, but not limited to, reservation protocols, quality of service mechanisms, or traffic engineering techniques.

In a variety of embodiments, the process 600 may monitor the traffic volume and capacity of reserved links (block 630). The monitoring can be done in real-time, periodically, or in response to certain events. The monitoring may involve various techniques such as, but not limited to, traffic analysis, capacity measurement, or performance monitoring.

In some embodiments, the process 600 may identify fluctuations in the relationship between the traffic volume and the capacity of the reserved links (block 640). The fluctuations can be identified based on various criteria such as, but not limited to, changes in traffic volume, changes in capacity, or deviations from predicted values. The fluctuations may also be identified using various techniques such as statistical analysis, trend analysis, or anomaly detection.

In more embodiments, the process 600 can determine if a fluctuation in the relationship is greater than a threshold (block 645). The threshold can be set based on various factors such as network policies, SLAs, or performance requirements. In additional embodiments, when the fluctuation in the relationship is not greater than the threshold, the process 600 can continue to monitor the traffic volume and capacity of the reserved links. On the other hand, in further embodiments, in response to the fluctuation in the relationship being greater than the threshold, the process 600 can redetermine the reserved links. In still more embodiments, the redetermining can be subject to hysteresis.

In still more embodiments, in response to the fluctuation in the relationship being greater than the threshold, the process 600 can redetermine the reserved links (block 650). The redetermination can involve various actions such as, but not limited to, reevaluating the traffic volume, reevaluating the capacity, or reevaluating the energy cost. The redetermination may also involve various processes or heuristics that aim to optimize network performance, energy efficiency, cost, or other objectives.

Although a specific embodiment for monitoring and adjusting reserved links in a network based on fluctuations in traffic volume and capacity is discussed with respect to FIG. 6, any of a variety of systems and/or processes may be utilized in accordance with embodiments of the disclosure. For example, the process can be applied to a distributed network where the nodes represent different data centers, and the links represent connections between them. The elements depicted in FIG. 6 may also be interchangeable with other elements of FIGS. 1-5, 7, and 8 as required to realize a particularly desired embodiment.

Figure 7:
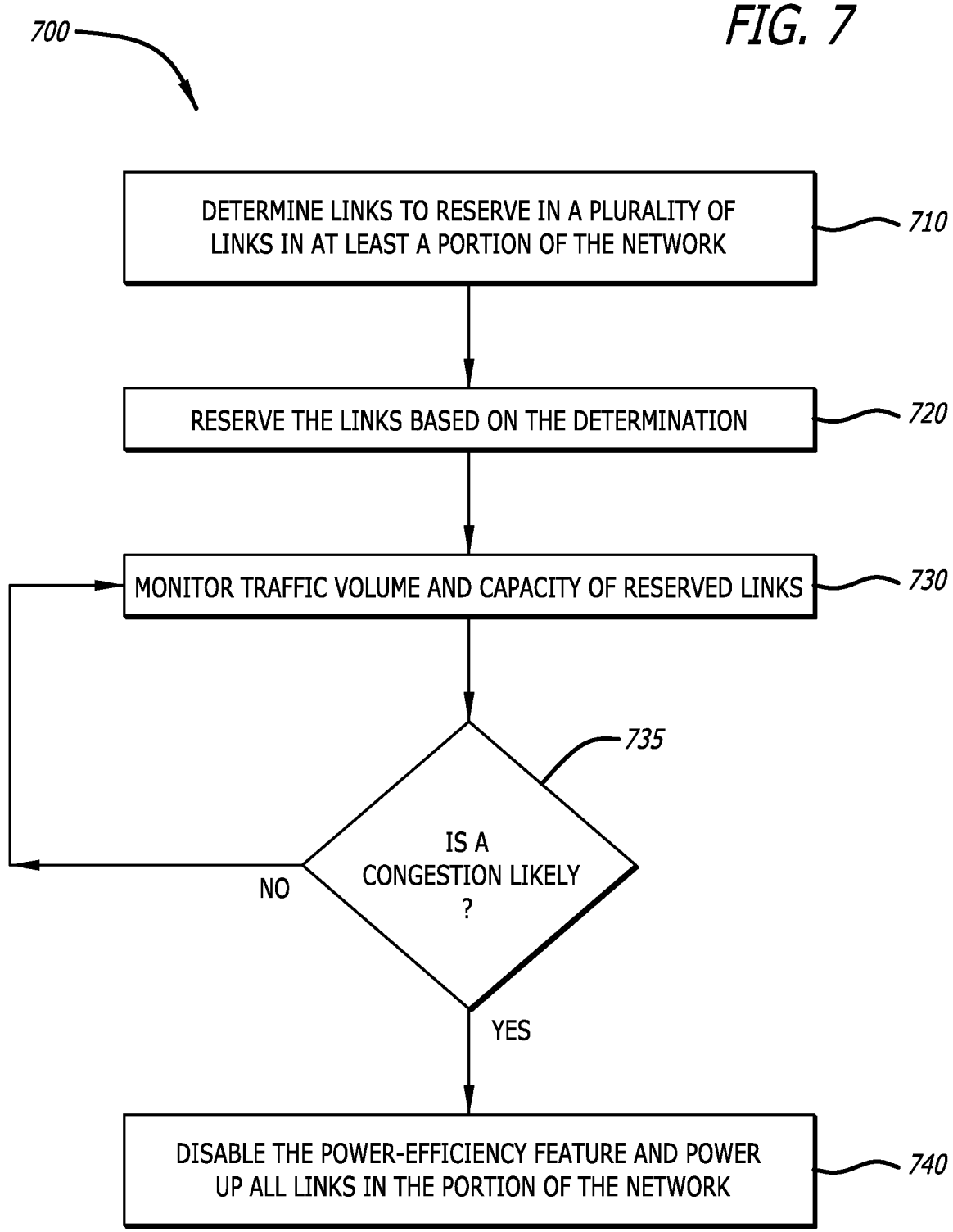
FIG. 7 is a flowchart showing a process for monitoring traffic in a network and disabling a power-efficiency feature in the event of likely congestion in accordance with various embodiments of the disclosure.

Referring to FIG. 7, a flowchart showing a process 700 for monitoring traffic in a network and disabling a power-efficiency feature in the event of likely congestion in accordance with various embodiments of the disclosure is shown. In many embodiments, the process 700 may determine links to reserve in a plurality of links in at least a portion of the network (block 710). The determination can be based on various factors such as, but not limited to, predicted traffic volume, capacity of the links, energy cost associated with each link, and other network parameters. The determination may also be made using various processes or heuristics that aim to optimize network performance, energy efficiency, cost, or other objectives.

In a number of embodiments, the process 700 may reserve the links based on the determination (block 720). The reservation can involve various actions such as, but not limited to, configuring network devices, setting up routing tables, or allocating resources. The reservation may also involve various protocols or mechanisms such as, but not limited to, reservation protocols, quality of service mechanisms, or traffic engineering techniques.

In a variety of embodiments, the process 700 may monitor the traffic volume and capacity of the reserved links (block 730). The monitoring can be done in real-time, periodically, or in response to certain events. The monitoring may involve various techniques such as traffic analysis, capacity measurement, or performance monitoring.

In some embodiments, the process 700 can determine if congestion is likely (block 735). The likelihood of congestion can be determined based on various factors such as, but not limited to, current traffic volume, capacity of the links, network policies, or performance specifications. In more embodiments, congestion may be determined as being likely when the current traffic volume exceeds a threshold. The likelihood of congestion can also be determined using various techniques such as, but not limited to, statistical analysis, trend analysis, or anomaly detection. In additional embodiments, when congestion is not likely, the process 700 can continue to monitor the traffic volume and capacity of the reserved links. In the other hand, in further embodiments, in response to congestion being likely, the process 700 can disable the power-efficiency feature and power up all links in the portion of the network.

In still more embodiments, in response to congestion being likely, the process 700 can disable the power-efficiency feature and power up all links in the portion of the network (block 740). The disabling of the power-efficiency feature can involve various actions such as turning on devices, increasing power levels, or exiting energy-saving modes. The powering up of all links may involve various actions such as configuring network devices, setting up routing tables, or allocating resources. Accordingly, the potential congestion can be alleviated and the network performance preserved.

Although a specific embodiment for monitoring reserved links in a network and disabling a power-efficiency feature in the event of likely congestion is discussed with respect to FIG. 7, any of a variety of systems and/or processes may be utilized in accordance with embodiments of the disclosure. For example, the process can be applied to a data center network, where the likelihood of congestion may be determined based on the workload of the servers, the amount of data being processed, or the network traffic patterns within the data center. The elements depicted in FIG. 7 may also be interchangeable with other elements of FIGS. 1-6 and 8 as required to realize a particularly desired embodiment.

Figure 8:
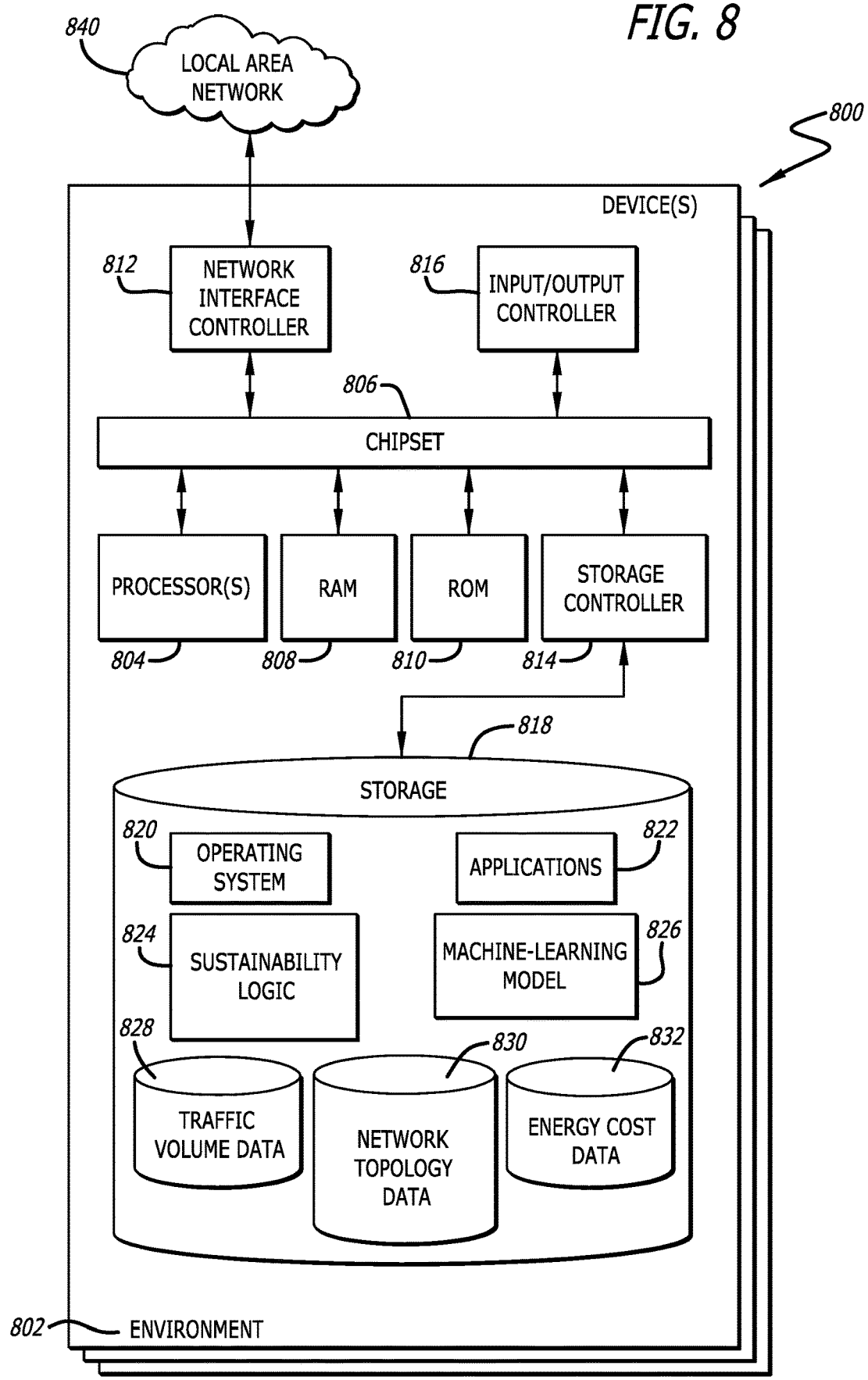
FIG. 8 is a conceptual block diagram for one or more devices capable of executing components and logic for implementing the functionality and embodiments described above.

Referring to FIG. 8, a conceptual block diagram for one or more devices 800 capable of executing components and logic for implementing the functionality and embodiments described above is shown. The embodiment of the conceptual block diagram depicted in FIG. 8 can illustrate a conventional server computer, workstation, desktop computer, laptop, tablet, network appliance, e-reader, smartphone, or other computing device, and can be utilized to execute any of the application and/or logic components presented herein. The device 800 may, in some examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In additional embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Different embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for example, store an operating system 820, applications 822, traffic volume data 828, network topology data 830, and energy cost data 832, which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

For example, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In various embodiment, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In more embodiments, the device 800 can also include computer-readable storage media having instructions stored thereupon for performing any of the other computer-implemented operations described herein.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8 and can include other components that are not explicitly shown in FIG. 8, or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

In many embodiments, the device 800 can include a sustainability logic 824. The sustainability logic 824 may use data such as traffic volume, network topology, and energy cost to determine the most environmentally sustainable paths for network traffic. By considering energy costs and aiming to minimize them, the sustainability logic 824 can contribute to the overall goal of reducing the environmental impact of network operations.

In a number of embodiments, the storage 818 can include traffic volume data 828. The traffic volume data 828 may refer to the amount of data being transmitted over the network during a specific period. The traffic volume data 828 can be utilized for understanding the load on the network and for making decisions about resource allocation. By analyzing the traffic volume data 828, the system can optimize network traffic distribution and improve network sustainability.

In various embodiments, the storage 818 can include network topology data 830. The network topology data 830 may relate to the structure of the network, including the nodes and links and their interconnections. The network topology data 830 can include details about the capacity and status of each link and node. Using the network topology data 830, the system can make decisions about the best paths for network traffic, optimizing for factors such as efficiency, cost, and sustainability.

In still more embodiments, the storage 818 can include energy cost data 832. The energy cost data 832 may relate to the energy consumption associated with each link and node in the network. The energy cost data 832 can be utilized for understanding the environmental impact and operational cost of network traffic. The energy cost data 832 can include such data as power consumption, carbon footprint, or cost of electricity. By analyzing energy cost data 832, the system can make decisions that optimize network traffic distribution in a manner that is both energy-efficient and sustainability-aware.

Finally, in many embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826. The ML model 826 may be configured to analyze historical and real-time data, such as traffic volume, network topology, and energy cost, to predict future network traffic patterns.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network node, comprising:
a processor;
at least one network interface controller configured to provide access to a network;
a memory communicatively coupled to the processor, wherein the memory comprises a sustainability logic that is configured to:
predict a traffic volume for at least a portion of the network;
identify a topology of the portion of the network, the portion of the network comprising a plurality of links and a plurality of nodes;
identify an energy cost, and capacity of each of at least some of the plurality of links and each of at least some of the plurality of nodes;
determine one or more links to reserve in the plurality of links based on the predicted traffic volume, energy cost, and the identified capacity, wherein an overall capacity of the one or more links is sufficient to serve the predicted traffic volume, and an attempt to reduce a number of links in the one or more links is made in determining the one or more links to reserve; and
reserve the determined one or more links.

2. The network node of claim 1, wherein the portion of the network corresponds to an interior gateway protocol (IGP) domain.

3. The network node of claim 1, wherein the traffic volume is predicted based on time-series data associated with bandwidth utilization over time in at least the portion of the network.

4. The network node of claim 1, wherein the predicted traffic volume is reevaluated for one or more further time durations based on an identified present traffic volume associated with at least the portion of the network.

5. The network node of claim 1, wherein the sustainability logic is further configured to depower one or more non-reserved links in the plurality of links.

6. The network node of claim 1, wherein the one or more links to reserve are determined based further on the identified energy cost, and an attempt to reduce a total energy cost associated with the one or more links is made in determining the one or more links to reserve.

7. The network node of claim 6, wherein the energy cost is associated with at least a respective power efficiency metric or an energy source type.

8. The network node of claim 1, wherein an attempt to minimize a number of changes in one or more link reservation states with respect to a set of previously reserved links is made in determining the one or more links to reserve.

9. The network node of claim 1, wherein the overall capacity of the one or more links being sufficient to serve the predicted traffic volume corresponds to one or more service level agreements (SLAs) being met.

10. The network node of claim 1, wherein the one or more links to reserve are determined based further on clustering one or more nodes in the plurality of nodes, and the one or more nodes are clustered based on one or more network usage patterns or a network utilization seasonality.

11. The network node of claim 10, wherein the one or more nodes are clustered based on a machine-learning process.

12. The network node of claim 1, wherein the sustainability logic is further configured to redetermine the one or more links to reserve in response to a changed relationship between the predicted traffic volume and the overall capacity of the reserved one or more links.

13. The network node of claim 12, wherein the redetermining is subject to hysteresis.

14. The network node of claim 1, wherein the sustainability logic is associated with one or more triggers.

15. The network node of claim 14, wherein the one or more triggers include at least one of: a policy, an application activity, or a power load.

16. The network node of claim 1, wherein the portion of the network includes at least one of an equal cost multi-path (ECMP) system, an unequal cost multi-path (UCMP) system, or a tunneling system.

17. The network node of claim 1, wherein the sustainability logic is further configured to enable all of the plurality of links regardless of the reservation in response to an actual traffic volume for the portion of the network exceeding a threshold.

18. The network node of claim 1, wherein the topology of the portion of the network includes a Layer 3 (L3) topology.

19. A network node, comprising:
a processor;
at least one network interface controller configured to provide access to a network;
a memory communicatively coupled to the processor, wherein the memory comprises a sustainability logic that is configured to:
predict a traffic volume for at least a portion of the network;
identify a topology of the portion of the network, the portion of the network comprising a plurality of links and a plurality of nodes;
identify a capacity of each of at least some of the plurality of links and each of at least some of the plurality of nodes;
identify an energy cost associated with each of the at least some of the plurality of links and each of the at least some of the plurality of nodes;
determine one or more links to reserve in the plurality of links based on the predicted traffic volume, the identified capacity, and the identified energy cost, wherein an overall capacity of the one or more links is sufficient to serve the predicted traffic volume, and an attempt to reduce a number of links in the one or more links and to reduce a total energy cost associated with the one or more links is made in determining the one or more links to reserve; and reserve the determined one or more links.

20. A method for managing sustainability in a network, comprising:

predicting a traffic volume for at least a portion of the network;

identifying a topology of the portion of the network, the portion of the network comprising a plurality of links and a plurality of nodes;

identifying an energy cost, and capacity of each of at least some of the plurality of links and each of at least some of the plurality of nodes;

determining one or more links to reserve in the plurality of links based on the predicted traffic volume, energy cost, and the identified capacity, wherein an overall capacity of the one or more links is sufficient to serve the predicted traffic volume, and an attempt to reduce a number of links in the one or more links is made in determining the one or more links to reserve; and reserving the determined one or more links.

* * * * *